INVENTOR
WALTER LEWIS HYDE
ATTORNEYS

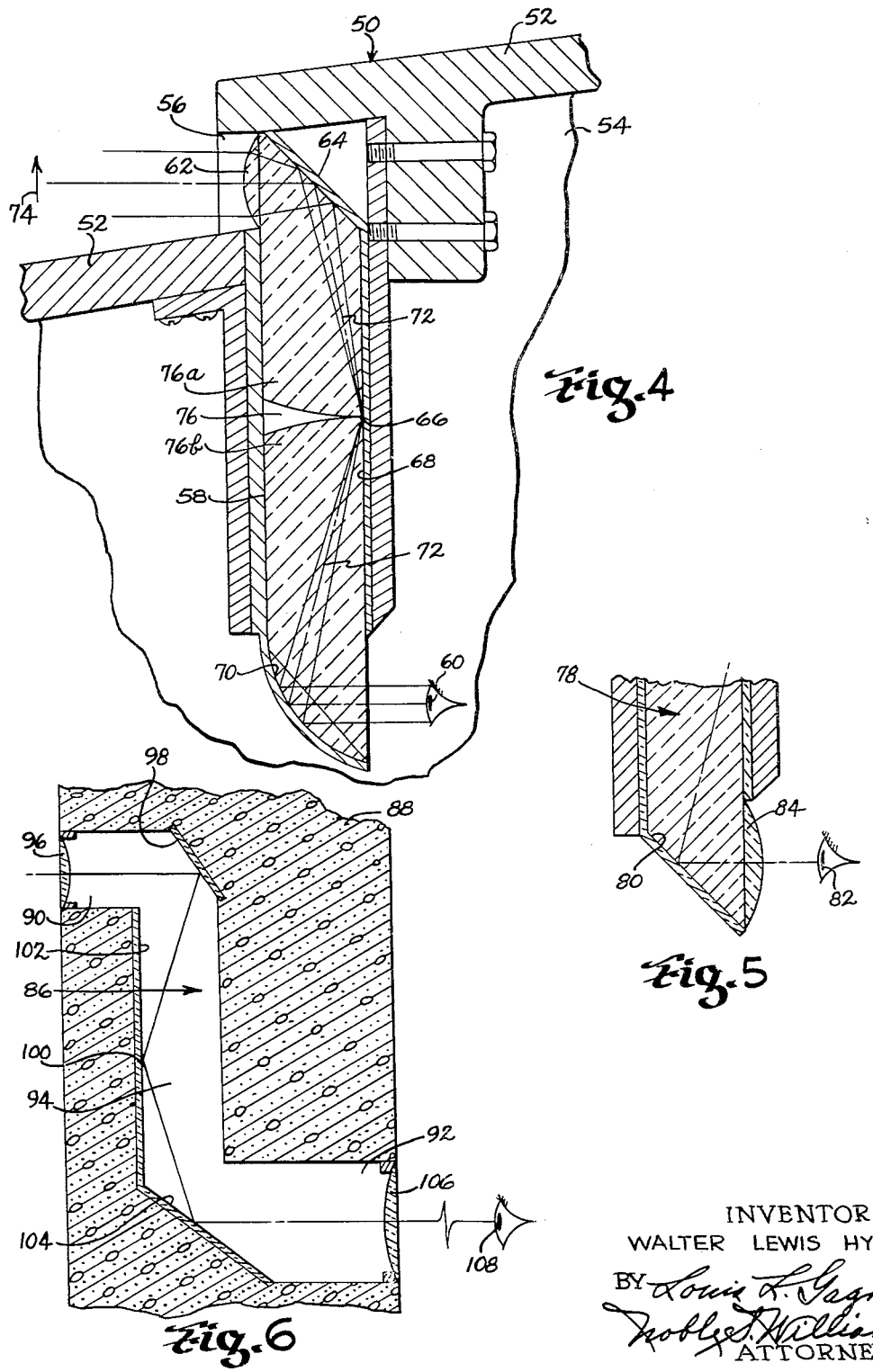

United States Patent Office 2,992,593
Patented July 18, 1961

2,992,593
PERISCOPIC OPTICAL SYSTEM
Walter Lewis Hyde, East Woodstock, Conn., assignor to American Optical Company, Southbridge, Mass., a voluntary association of Massachusetts
Filed Nov. 12, 1957, Ser. No. 695,584
10 Claims. (Cl. 88—70)

This invention relates to improvements in periscopic optical systems and has particular reference to optical systems which are adapted to provide an observer using the same with a relatively large unobstructed and realistically appearing view of a predetermined object field from an eye position in offset relation with said object field.

In instances where it is impossible or impractical for the eyes of an observer to be located in a position for directly viewing a predetermined object field, it has been customary to provide means in the form of a periscope for viewing said field from an eye position in offset relation to said field. However, in extra high speed and supersonic aircraft wherein it is usually required that the pilot be located in the fuselage at a position well behind the forward end of the aircraft, it has been the practice heretofore to provide a transparent bubble-type canopy or windshield protruding outwardly of the fuselage for presenting a clear and unobstructed forward field of view of sufficient size to the pilot. Constructions of this sort tend to destroy the streamlining of the body or fuselage in high speed vehicles and aircraft and tend to produce a drag during travel or flight thereof which slows the plane or vehicle down considerably or even excessively. Furthermore, the entire skin or fuselage surface of a supersonic plane is heated by aerodynamic effects during flight and it is extremely difficult and expensive to manufacture a transparent canopy or windshield which is capable of withstanding the required pressures and temperature gradients so generated of, for example, as much as 300°–400° Fahrenheit.

For these and other obvious reason, the conventional transparent canopies and windshields are impractical in supersonic aircraft and, accordingly, it has been proposed that the pilot be located well within the fuselage of the aircraft and be provided with a periscopic means as a substitute for a protruding windshield or the like. In fact, in the "Journal of The Optical Society of America," volume 46, page 944 (1956), there is described an elaborate example of such a periscope in the article entitled "Aircraft Flight by an Optical Periscope." This article sets forth some of the many problems which must be solved with regard to periscopic means of this nature, and also provides useful background information on the prior art. Even though numerous periscope arrangements have been designed and built in response to the urgent need for a solution to the problems of satisfactorily eliminating the conventional protruding windshileds in extra high speed and supersonic aircraft, all have failed in one respect or another to satisfy the requirements of this problem.

In the case of certain other types of vehicles such as tanks, or the like, where the problem of protecting the operator is of primary concern, it has been customary to locate the operator well within the armored body of the vehicle and to provide a periscopic viewing means through which he may observe a forwardly directed object field. It is a well wnown fact, however, that with conventional tank periscopes the operators' forwardly directed view is greatly restricted in both the vertical and horizontal meridians. That is, in effect, he is looking through an opening or slot of substantially the size and shape of the externally exposed optical element of the periscopic system from an eye position at a considerable distance inwardly from said slot. This causes the operator to tend to move his eyes as close as possible to the eyepiece of the periscope in an attempt to broaden and increase the height of his field of view. The constant urge to see more of the forwardly directed outer surroundings of the vehicle tends to frustrate and fatigue the operator. Of the various prior tank-type periscopes, all have failed in one way or another to provide an operator with a relatively large realistic and normally appearing field of view of the forward outer surroundings of the vehicle.

Many elaborate and expensive variations of the tank-type periscope have also been used in "hot laboratories" where intense radioactivity is present. Since operations in such instances must be carried on with precision, it is essential that an accurate and realistic view of the operations be provided from a remote and protected area, and it is further essential that no atomic radiation be transmitted through the viewing system. The disturbing problem of economically providing an improved wide and realistically appearing field of view in such cases is still existent and the construction and arrangement of the present invention is intended to overcome the difficulties encountered heretofore with regard to the various conditions set forth above as well as others too numerous to mention.

It is, therefore, a primary object of the invention to provide viewing means of the periscopic type which is designed to present to an observer using the same, a field of view of substantial size, considered both vertically and horizontally, when looking in a forward or a predetermined direction and with all parts of said field visible stereoscopically and preferably at unit magnification.

Another object is to provide viewing means of the above character which is light in weight, compact, and inexpensive to manufacture, and which advantageously may be fitted into its intended position of use with little or no modification of the device or structure receiving the same.

Another object of the invention is to provide viewing means or a viewing system of the character described which not only offers all of the above-mentioned features but which further permits a person using the same to have substantial freedom of head movements while seated or otherwise located in a comfortable position relative to said viewing means or system.

Another object is to provide in a viewing system of the above character, novel adjustable means for readily adjusting the eye position of said system to satisfy the slightly different normal locations of the eyes of different persons using the viewing system.

Another object is to provide periscopic viewing means or viewing systems for vehicles in which parts can be constructed and arranged so as to provide for superimposing illuminated instrument dial readings or the like into the field of view obtained from the periscope, whereby useful auxiliary information such as altitude, speed, artificial horizon, etc., may be perceived by the operator of the vehicle while simultaneously scanning the field of view through said periscope.

A further object is to provide an optical viewing system of the above character for use in vehicles such as tanks or aircraft or the like and wherein an exit pupil of substantial size is provided therein for the eyes of a user so that a clear view of an object field may be obtained even though some head movements occur, whereby a view of said object field may be continuously maintained during normal buffeting, shock of impact at landing or other vibratory actions of the vehicle which may occur during its operation.

A still further object is to provide periscopic viewing means for use in "hot laboratories" which embodies the use of elongated cylindrically shaped optical components disposed in optically aligned relation with each other along an extended predetermined portion of the walls of said laboratory to provide a clear and realistic view of the interior of said laboratory from any location exteriorly thereof along said predetermined portion of the walls and within the eye position of said system, whereby observers may be stationed in side-by-side relation with each other along said predetermined portion of the walls and each will simultaneously observe a realistic view of the interior of said laboratory.

Other objects and advantages of the invention will become apparent from the following description when taken in conjunction with the accompanying drawings in which:

FIG. 4 is a fragmentary vertical longitudinal cross-sectional view of a portion of a vehicle such as an armored car or tank and illustrating a type of viewing system embodying the invention which is more specifically designed for use in such a vehicle;

FIG. 5 is a fragmentary vertical cross-sectional view of a portion of a viewing system which illustrates a suggested modification of the device of FIG. 4; and FIG. 6 is a fragmentary vertical longitudinal cross-sectional view of an optical viewing system of the invention illustrated in a position of use in a stationary object such as a wall or the like.

Figure 1:
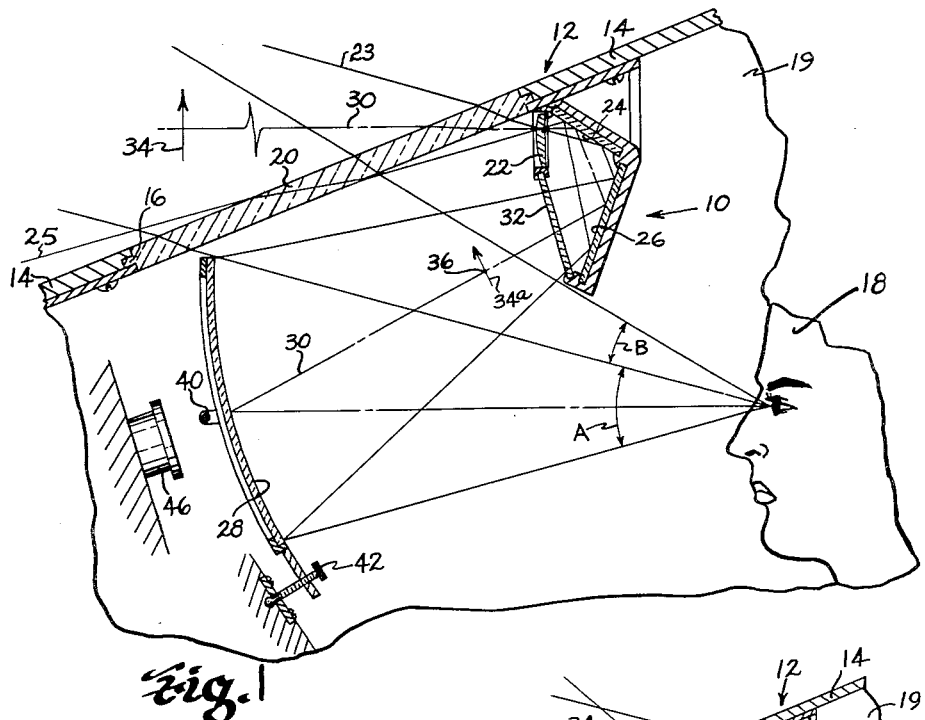
FIG. 1 is a fragmentary vertical longitudinal cross-sectional view of a portion of an aircraft fuselage diagrammatically illustrating the constructional and the functional details of an embodiment of the invention.

Referring more particularly to the drawings wherein like characters of reference designate like parts throughout the various views, there is diagrammatically shown in FIG. 1 a prefererd scheme of installation and use of a periscopic viewing system 10 of the invention as applied to a high speed vehicle, for example, a supersonic type of aircraft 12 which is set forth herein as illustrative of one form of the invention. A typical highly streamlined configuration of the fuselage of an aircraft is illustrated by the wall portion 14 which is provided with a viewing port or opening 16.

However, it will be appreciated that because of the sloping position of this opening the size of the object field which can be seen by a person from a suitable position within the fuselage is very much restricted even though the opening 16 is of appreciable size. Also it must be readily appreciated that while an upwardly and forwardly directed view will be obtained, nevertheless, a view of the object field directly ahead of the aircraft or vehicle cannot be obtained, and even if it were physically possible for a person to position his head immediately below the fuselage and near the upper edge of the opening 16 in order to see directly ahead of the aircraft, the view obtained would still be far from adequate both from the standpoint of vertical size of the view and also from the standpoint of not being able to see forwardly and downwardly sufficiently.

While a substantial vertical and horizontal field of view in a forward direction will be desired by a pilot 18 located in a cockpit 19 entirely inside the fuselage, it will become apparent from the description which follows that only a portion of the total desired field of view will be observed directly through the port 16. However, another portion adjoining this portion and disposed directly ahead of the aircraft may be observed through the periscope 10. Thus, the two combined portions of said field of view will provide the pilot 18 with a complete forwardly directed wide and high panorama of the outer surroundings. It is particularly pointed out that the field of view offered to a pilot by the viewing means or improved device of the invention is substantially equal to or even greater than that experienced heretofore in supersonic aircraft having protruding type windshields.

It will be observed in FIG. 1 that the viewing port or opening 16 is covered by a thick transparent shield or window 20 which is preferably formed of a plane-parallel slab of heat resisting transparent material such as, for example, fused quartz. (In certain instances, glass or plastic might be used as well as any of the well-known types of transparent bullet-proof material.) The shield 20 is fitted and secured snugly into the viewing port 16 with its outermost surface in substantially flush relation with the outer surface of the wall portion 14 of the aircraft 12. In this manner, the streamlining of the fuselage is unencumbered and during flight substantially no extra drag will thus be imposed at the viewing port 16. Furthermore, it is relatively simple and economical to manufacture a flat transparent heat-resisting shield, such as shield 20, as compared to the bubble-type canopies or protruding type windshields which have been used heretofore in supersonic aircraft.

In order to provide the pilot 18 or observer with a wide forwardly directed field of view through the transparent shield 20, the periscope 10 is located within the cockpit 19 substantially in the manner diagrammatically illustrated in FIG. 1 and comprises an elongated cylindrically curved objectives lens 22, a pair of plane front surfaced mirrors or specularly reflecting surfaces 24 and 26 and a concave cylindrically shaped mirror 28. The mirror 28 may, for purposes to be later described, be either 100% reflective or semi-transparent, as, for example, 80% reflective and 20% transmissive. Cylindrical lens 22 and cylindrical mirror 28 are arranged in optical alignment with each other along a common optical axis 30 with their respective axial meridians extending in transverse directions relative to the common optical axis 30 and in substantially parallel relation with each other.

Light from the object field directly forwardly of the aircraft will enter the cockpit 19 through the transparent shield 20 and will enter the periscope through the objective lens 22. While light from any part of this object field and passing through the thick transparent shield 20 will be displaced slightly as indicated by upper and lower marginal rays 23 and 25, it will be noted that the paths of the rays about to enter the lens 22 will be substantially parallel to their respective paths before entering the plane-parallel transparent shield 20.

The lens 22 however, has positive refracting power in its vertical meridian but is without refracting power in its horizontal meridian. Immediately behind the objective lens 22 is the tilted mirror 24 and below this mirror is a second tilted mirror 26 so that light passing through lens 22 will be reflected by mirror 24 and then mirror 26 towards the front of the cockpit 19 and toward the mirror 28. Mirrors 24 and 26 besides serving to direct the light rays downwardly and then forwardly toward mirror 28, also function to invert the light rays coming from an object being viewed through the system, so as to ultimately cause the image thereof being observed by the pilot 18 to appear right side up as will become more apparent hereinafter. The light from mirror 26 passes through a component 32 which in the construction illustrated in FIG. 1 is a plane surfaced window having substantially no refracting or other optical effect on the light rays and functioning only in the construction to hermetically seal in the mirrors 24 and 26 and to keep them clean.

After having passed through window 32, the light falls upon the concave cylindrical mirror 28 which is disposed with its axis in a horizontal direction as illustrated in FIG. 1. It is a matter of indifference in the elementary design of the periscope 10 whether the front surface or back surface of the mirror 28 is treated so as to serve as the surface reflecting the light rays from the object field. For purposes of illustration, the front surface of mirror 28 is shown as being aluminized or coated in known manner for light reflecting purposes, and in the present instance this surface will be rendered substantially 100% reflective and thus will cause substantially all of the light being received to be reflected to the eyes of the pilot 18.

To more fully understand the mode of operation of the periscope 10 illustrated in FIG. 1, it is convenient to treat separately the behavior of the system in a vertical meridian and in a horizontal meridian. FIG. 1 illustrates the behavior in the vertical meridian. Thus, if a faraway object in an upright position as indicated by an upright arrow 34, is in the field of the objective, then the objective lens 22 will cast an image 34a thereof at a distance from lens 22 equal to its focal length which in FIG. 1 is illustrated as being at the focal point 36. Due to the folding of the light rays by the pair of mirrors 24 and 26, the image of arrow 34 which is inherently inverted a first time by lens 22 is re-inverted by mirrors 24 and 26 so as to be rendered upright as indicated at 34a. Light from each point of image 34a now diverges to concave cylindrical mirror 28 which is located to lie at a distance from point 36 equal to its focal length. The focal points of both the lens 22 and mirror 28 are purposely made equal and coincident at point 36. The result thus obtained is that light rays diverging from points in the image 34a are collimated by mirror 28 and mirror 28 may be seen, insofar as the vertical meridian is concerned, to be analogous to the eyepiece of a simple telescope, and thus may appropriately be called an eye-mirror. In order to cause far away objects or objects at infinity to be seen with the same angular size through the periscope as they would be seen without it, that is, to provide a unit-power telescope for distant objects, the focal length of objective lens 22 is controlled so as to be equal to the focal length of the eye-mirror 28.

Figure 2:
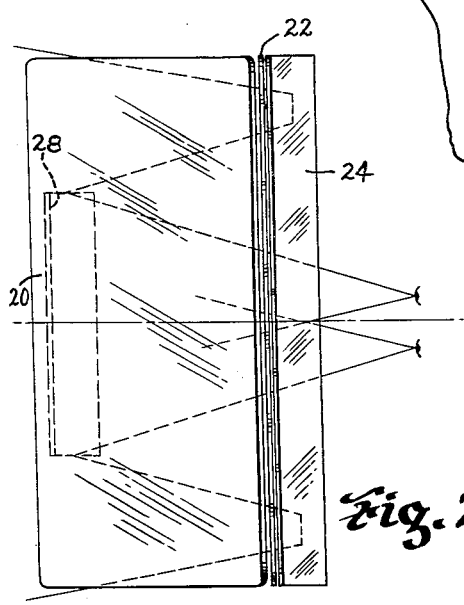
FIG. 2 is a diagrammatic top plan view of the optical components of the viewing system shown in FIG. 1.

Behavior of the periscope light rays in a horizontal meridian will now be discussed. Since the objective lens 22 and the eye-mirror 28 are both cylindrical components and are disposed in parallel relation to each other as illustrated in FIG. 2, it is obvious that there is no magnification or minification influence in the horizontal meridian on the light rays entering the system. That is, in the horizontal meridian the cylindrical components function merely as plane windows and plane mirrors and thus in effect have unit power. It can then be seen that the transmitting of the light rays at unit power in the horizontal meridian in combination with the transmitting of the light rays at unit power by refraction and reflection in the vertical meridian by the periscope 10 of FIG. 1 will present a field of view to the eyes of the pilot 18 which will be seen binocularly in its natural size and proportions and thus will be remarkably life-like in apperance.

It is particularly pointed uot that since the periscope 10 has no magnification influence on the light rays in so far as the horizontal direction of the system is concerned, stereoscopic effects are undisturbed and stereoscopic judgement or judging of distances can be readily and accurately made by the pilot 18. Furthermore, the transverse dimensions of the components can be made as long as desired without disturbing the character of the view obtained except that longer components will give a wider field of view.

It is to be understood, however, that the eyes of the pilot 18 must be located at the "exit pupil" or eye position of the periscope optical system in order to correctly view the object field discussed above. By "exit pupil" it is meant the area defined by the image of lens 22 which is formed by mirror 28 (when considered in a vertical meridian). Said image will be at a distance from mirror 28 equal to the radius of curvature thereof, and this image will be of the same height as lens 22 since the system is a unit power system. Of course, in the transverse direction of the system this exit pupil will be of considerable length and will depend upon the transverse length of the cylindrical mirror 28. Accordingly, if the eyes of pilot 18 are located in this exit pupil, they will be in effect imaged at the plane of the lens 22 and he will see the full field of view in substantially its original intensity, diminished only slightly by the transmission losses in the system. If he lifts or lowers his head a little so as to be out of this exit pupil, he will not see the field of view through the periscope. On the other hand, he may shift his head laterally considerably and still see the object field. Thus, with the eyes of pilot 18 located in the exit pupil, the image which he will observe will appear to him to be the same as if his eyes were actually at the location of the objective lens 22.

It is obvious that the size of the exit pupil is proportional to the size of the optical components of the periscope 10 including the transparent shield 20. Therefore, a compromise must be made between the evident value of enlarging the exit pupil and the evident value of reducing the size of said components and shield. A reasonable compromise has been found to be a one inch high exit pupil which obviously requires that the objective lens 22 be one inch in height and that the other components be compatible in size. Under ordinary circumstances the one inch high exit pupil is sufficient for comfortable observation through the periscope. That is, buffeting of the aircraft in rough air or impact shock at touchdown would not cause the eyes of the pilot to be displaced an amount sufficient to cause him to lose sight of his object field.

To aid in locating the exit pupil at the proper height so as to be located at the eyes of the pilot regardless of his stature, the periscope system has been made adjustable by providing pivot means 40 on mirror 28 at its upper edge and an adjustment screw 42 at its lower edge. Adjustment of screw 42 in one direction will tilt mirror 28 toward pilot 18 to raise the exit pupil or eye position and adjustment of screw 42 in the opposite direction will tilt mirror 28 away from pilot 18 to lower the exit pupil or eye position.

In a unit power periscope of the type illustrated in FIG. 1, it has been found that an eye-mirror 28 which is approximately 9 inches high, 12 inches wide and spaced at a distance of 16 inches from the eyes of the pilot when used in conjunction with an objective lens 22 approximately 24 inches in width and one inch high will present to the pilot an angular field of view of approximately 30° in the vertical meridian and 40° in the horizontal meridian. If, however, the configuration of the cockpit 19 is such that it prevents locating the pilot 18 comfortably with his eyes substantially in the plane of the exit pupil of a periscope system of such dimensions, the exit pupil may be moved forwardly or rearwardly somewhat from its normal position described above and this may be accomplished by insertion of a cylindrically curved field lens 44 at or as near as is conveniently possible to the image 34a or in other words in the vicinity of the image 34a of the system, as shown more particularly in FIG. 3 wherein the window 32 of FIG. 1 has been replaced by lens 44.

Figure 3:
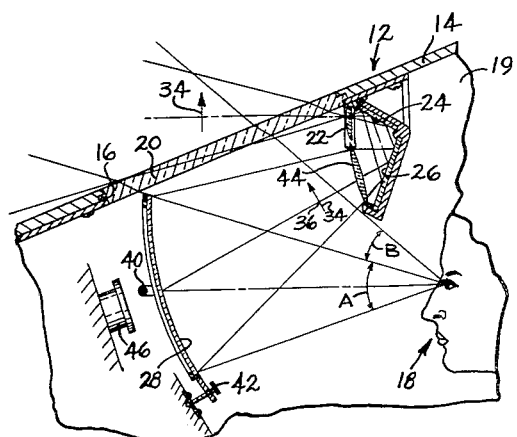
FIG. 3 is a view generally similar to FIG. 1 but illustrating a modified form of the type of viewing system illustrated by FIGS. 1 and 2.

The lens 44 serves to locate the exit pupil of the optical system closer to the eye-mirror 28 of the system when lens 44 is of positive refracting power and further from the eye-mirror when it is of negative refracting power. The introduction of this field lens does not substantially increase the complexity or weight of the periscope because it is appropriate to seal the mirrors directly therebehind in the manner shown and described above with respect to the window 32 of FIG. 1. In FIG. 3, the lens 44 performs the dual function of hermetically sealing its respective mirrors and simultaneously locating the exit pupil of the system in accordance with its refractive power.

It is to be understood, however, that in order to precisely retain the unit power magnification factor of the periscope optical system, the cylindrical field lens 44 should be located half way between the objective lens 22 and mirror 28 or at the coincident focal point 36 of mirror 28 and lens 22. However, to have said lens function to replace window 32 and to avoiding possible restriction of direct vision through shield 20, it is desirable to locate the lens 44 as shown in FIG. 3, closer to lens 22. This causes only a slight change in the magnification factor of the system which, if desired, may be compensated for by redesigning lens 22 so as to cause it in combination with field lens 44 to form image 34a at the focal point 36 of mirror 28.

In the optical systems shown in both FIGS. 1 and 3 the forward-looking periscopic field of view will be substantially identical with that seen through the conventional canopies or bubble type windshields of present day types of supersonic aircraft. That is, things lying straight ahead of the aircraft in the improved structure of the present invention in reality will appear precisely straight ahead through the periscope. In order to combine this forward-looking periscopic field of view with a forwardly and upwardly-looking field of view which may be seen directly through the transparent shield 20 by the pilot 18 and thus provide a combined viewing system having a materially larger field of view, the upper edge of the eye-mirror 28, as shown in FIG. 1, may be located so as to be substantially coincident with the lower edge of the field of view seen directly through the transparent shield 20. Thus, it can be seen that the indirect vertical field of view indicated by angle A through the periscope 10 when combined with the immediately adjacent direct field of view indicated by the angle B through the transparent shield 20 together provide a combined vertical field of view which is extremely wide and comparable to that experienced with conventional windshields.

It is pointed out that since the forward-looking field of view through the periscope 10 is seen at unit magnification and objects viewed therein are seen in true form and location as described, it is possible by the arrangement shown in FIG. 1 to view a large object which is partially located in the direct field of view (angular field B) and partially in the indirect or periscopic field of view (angular field A) without experiencing any appreciable effects of distortion, misalignment of parts, etc. of the object being viewed. Furthermore, the complete object field will be seen by the viewer without interruption or omission since the fields A and B are in adjoining relation with each other as described above.

Due to the fact that it has been necessary to provide an eye-mirror 28 which is relatively large in size so as to obtain a substantial field of view through the periscope 10, some of the area inside the cockpit of the aircraft which would normally be available for instruments might be obscured by mirror 28 if proper steps to care for this condition were not taken. However, in order to make double use of this cockpit area, it is proposed herein to make mirror 28 semi-transparent by any of the mirror coating methods well known to the art. For example, by causing mirror 28 to be 80% reflective and 20% transmissive, instruments (such as air speed indicators, altimeters, artificial horizon indicators or the like) located behind the mirror 28 and diagrammatically illustrated at 46 in FIG. 1 may be observed. The instruments may be illuminated at all times, if desired, in which case they will be seen superimposed upon the forward field of view, or they may be so arranged that they are illuminated only when they demand the attention of the pilot.

Two items which are of primary importance and which should be kept in mind in considering the periscopic optical system disclosed herein and which have jointly contributed to the success of said system are (1) that the cylindrically curved objective lens 22 is of small vertical height and (2) that this lens is located closely adjacent the fuselage of the aircraft or vehicle. These two items together enable the user of the periscope to have his eyes re-imaged at and thus, in effect, located at the plane of the objective 22, a position which could not possibly be actually occupied by the eyes of the person using the periscope, as is clearly evident from inspection of FIGS. 1 or 3.

While the viewing systems of FIGS. 1–3 have been set forth above as being more specifically designed for use in high speed vehicles, such as aircraft, it is to be clearly understood that the invention is readily adaptable to other vehicles such as armored cars, military tanks or boats where it is necessary to suitably contour or streamline the body of said vehicles and at the same time provide the operator of the particular vehicle with a substantial forwardly directed panoramic view of the outer surroundings. It is particularly pointed out that the streamlining of relatively slow moving vehicles such as armored cars or tanks renders such vehicles less vulnerable when under fire. That is, bullets or shrapnel striking a streamlined vehicle would tend to ricochet rather than penetrate.

FIGS. 4 and 5 of the drawings illustrate a modified form of the invention wherein there is shown a periscopic optical system more specifically designed for use in vehicles such as military tanks or the like. It will become apparent from the description to follow that the optical characteristics of the systems of FIGS. 4 and 5 are generally similar to the above-described systems of FIGS. 1–3.

In referring more particularly to FIG. 4, there is illustrated a portion of a vehicle body 50 having an upper wall portion 52 enclosing an operator's compartment 54 within the vehicle. In the case of a conventional military tank or the like, the wall portion 52 is usually formed of a relatively thick armor plate and is stepped down forwardly of the vehicle to provide a viewing slot or opening 56 generally in the manner illustrated. The opening 56 is usually formed rectangular in shape and of a width greater than its height so as to provide an operator of the tank with a relatively wide field of view in the horizontal meridian when viewed through a periscope which is located within the tank and disposed so as to direct light rays entering said opening 56 inwardly of the operator's compartment to the eyes of an observer.

In the conventional military periscope, however, which has consisted of a pair of plane mirror surfaces adapted to direct the light rays entering opening 56 along an extended optical path (either through air or other medium such as plastic or glass), the field of view presented to the observer has been considerably restricted since it can be appreciated that with such a system, the observer is effectively looking through a slot which is spaced from his eyes a distance substantially equal to the length of the optical path through said periscope. With the periscopic optical system of the invention (FIG. 4), however, it will become apparent that the eyes of an observer, although still actually in substantially the same viewing location within the vehicle, are effectively placed at the slot or opening 56 in the manner described above for the optical systems of FIGS. 1–3. In this respect, it is obvious that a considerably greater field of view of the outer surroundings of the vehicle is possible both in the vertical and horizontal meridians.

The periscopic optical system illustrated in FIG. 4 comprises an elongated rectangularly shaped block 58 of transparent optical medium such as glass, plastic or the like which is of substantially the same cross-sectional size and shape as opening 62. The block 58 extends vertically within the operator's compartment 54 of the vehicle 50 between a location at its uppermost end slightly rearwardly of opening 56 and a location at its lowermost end slightly forwardly of a predetermined eye position 60 of the operator of said vehicle. At the uppermost end of block 58, there is provided a cylindrically shaped optical element 62 facing forwardly of vehicle 50 and of a height and width substantially equal to the height and width of opening 56 with its major axis disposed in the direction of the width of opening 56.

The optical element 62 has positive refracting power in its vertical meridian but is without refracting power in its horizontal meridian and may be formed integrally with the block 58 or formed as a separate element and cemented or otherwise attached thereto in optically perfect joined relation with said block. Immediately behind the optical element 62, the block 58 is provided with an optically finished downwardly sloping plane surface 64 which is rendered highly reflective by any of the commonly known methods of preparing mirrored surfaces.

The reflecting surface 64 is so angularly disposed relative to the optical element 62 as to cause image-forming light rays entering the block 58 through opening 56 and optical element 62 to be directed downwardly and inclined slightly rearwardly to a location 66 at the rear surface 68 of block 58 which location 66 is at a distance along the optical path of said light rays substantially equal to the focal length of the optical element 62. The rear surface 68 of block 58 is optically finished and by virtue of total-internal reflection or a suitable reflective coating will reflect and redirect these light rays, which beyond focal point 66 become divergent rays, through block 58 slightly forwardly and downwardly at an angle of reflection equal to the angle of incidence of said light rays at location 66.

The forwardly directed side of the lowermost end of block 58 is provided with an optically finished cylindrically curved highly reflective surface 70 having its major axis disposed in substantially parallel relation with the major axis of the optical element 62. The cylindrically curved surface 70, which also has positive power, is so angularly disposed relative to the plane of the reflective surface 68 as to receive these divergent light rays from surface 68 and direct the same as parallel rays rearwardly toward the eye position 60 of the system.

In order to cause the optical system of FIG. 4 to have a magnification factor of one, or be of unit magnification in a manner analogous to the systems of FIGS. 1–3, the cylindrical surface 70 is located in the optical path of these divergent light rays at a distance from location 66 substantially equal to its focal length and its focal length is controlled to be substantially equal to the focal length of optical element 62. Location 66 is, therefore, obviously optically disposed substantially midway between the optical element 62 and the cylindrical surface 76 along the common optical axis 72 of the system.

The mode of operation of the optical system of FIG. 4 is substantially identical to the optical systems of FIGS. 1–3. In this respect, it is again convenient to treat separately the behavior of the system in a vertical meridian and in a horizontal meridian. FIG. 4 illustrates the behavior of the optical system in the vertical meridian. Thus, if a far-away object in the field of view of the system (forwardly of the vehicle 50) is indicated by an upright arrow 74, the optical element 62 (which will hereinafter be referred to as the objective lens) will cast an image thereof at a distance from objective lens 62 equal to its focal length.

Due to the folding of the light rays by the reflective surfaces 64 and 68, the image of arrow 74 which is inherently inverted a first time by the objective lens 62 is reinverted by mirror 68 so as to be rendered upright. Light from each point of the image now diverges to the cylindrical reflecting surface 70 which is located to lie at a distance from location 66 substantially equal to its focal length. The result thus obtained is that light rays diverging from points in the image are collimated by the cylindrical reflecting surface 70 and directed thereby toward eye position 60. The reflecting surface 70 may then be considered, insofar as the vertical meridian is concerned, to be analogous to the eye piece of a simple telescope.

The behavior of the light rays passing through the periscope of FIG. 4 in the horizontal meridian is not illustrated in the drawings since it is obvious that the objective lens 62 and the cylindrical reflecting surface 70, being disposed in parallel relation to each other, will produce no magnification or minification influence on said light rays in the horizontal meridian. Thus, in the horizontal meridian, the cylindrical components function merely as plane windows and mirrors and, in effect, have unit power. By the transmitting of the light rays at unit power by refraction and reflection in the vertical meridian in combination with the transmitting of the light at unit power in the horizontal meridian by the periscope of FIG. 4, a field of view will be presented to the eyes of an operator at the eye position 60 which will be seen binocularly in its natural size and proportions with undisturbed stereoscopic effects.

It is to be understood, however, that the eyes of the operator must be located at the "exit pupil" or eye position of the periscope optical system in order to correctly view the object field discussed above. The term "exit pupil" has been defined hereinabove and in the optical system of FIG. 4, it would, accordingly, be located at a distance from the cylindrical reflecting surface 70 equal to its radius of curvature provided the block of optical medium 58 were solid and not formed with an air lens 76 such as shown in FIG. 4.

Since the operator's compartment of a conventional military tank or the like is usually designed to seat the operator in such a position as to locate his eyes relatively close to his periscope and most tank operators are accustomed to placing their eyes as close as possible to the periscope in order to maximize their field of view through conventional tank periscopes, it is most advantageous, particularly when using the periscope system of FIG. 4 as a replacement for conventional tank periscopes, to provide means for locating the exit pupil or eye position 60 of the system close to the cylindrically curved reflective surface 70 in the manner shown in FIG. 4. To do so, it is necessary to provide a field lens substantially at the coincident location 66 of the focal planes (in the vertical meridian) of the objective lens 62 and cylindrically reflecting surface 70. This is done in a manner analogous to the insertion of the field lens 44 shown in FIG. 3 and described above. It is to be remembered that when a field lens is positioned at said coincident location of the focal planes, the magnification factor of the system is not disturbed but when the field lens is positive in refracting power it will serve to move the exit pupil or eye position closer to the periscope and when negative in power it will serve to move the exit pupil or eye position further away from the periscope.

The exit pupil or eye position 60 of the periscope system in FIG. 4 is illustrated as being in close relation with the periscope and this is accomplished by the use of the above-mentioned air lens 76 which, in effect, is the equivalent of a conventional positive lens such as lens 44 of FIG. 3 when it is used in conjunction with the solid optical medium of block 58. The curvature 76a and 76b of the air lens 76 are, of course, cylindrical in shape and extend throughout the width of block 58 and it is also to be understood that their radii determine the power of the air lens in its vertical meridian and ultimately the location of the eye position 60 of the system.

The air lens 76, like the other optical elements in the system, has no magnification or minification effect on light rays passing therethrough in the horizontal meridian. The field lens 76 would be made negative in power by reversing the curvatures of its surfaces 76a and 76b in a well known and conventional manner. It is further pointed out that the space between the surfaces 76a and 76b may be filled with a transparent optical medium of a different index of refraction than that of the optical medium comprising block 58 to strengthen the periscope structure without altering the refracting characteristics of the system provided surfaces 76a and 76b were properly curved in accordance with the index of refraction of said filler.

As in the case of the periscopic optical systems of FIGS. 1–3, the opening 56, objective lens 62, block 58 and cylindrical mirror surface 70 of the device of FIG. 4 may be constructed to be of any desired width or transverse dimension without disturbing the character of the view obtained thereby except that wider components will widen the field of view. Furthermore, the size of the exit pupil of the system is also proportional to the size of the above-mentioned components in accordance with the teachings set forth above with regard to the systems of FIGS. 1–3.

There is illustrated in FIG. 5 a modified lower end portion of a periscope of the type shown in FIG. 4. To replace the lower end of the periscope of FIG. 4 with that of FIG. 5 would accomplish precisely the same optical results. The lower end of the periscope 78 of FIG. 5 is provided with a flat downwardly and rearwardly sloping highly reflective surface 80 which functions to fold the light rays received thereby rearwardly toward an eye position 82 and a cylindrical positive refracting lens element 84 which is optically secured to or integrally formed with the periscope. The lens element 84 functions to collimate the light rays reflected by surface 80. Thus, the combination of surface 80 and element 84 constitute the optical equivalent of the cylindrically curved reflective surface 70 of the device of FIG. 4.

Since optical systems of the character just described need not be restricted in use to vehicles, there has been shown a further modification of the invention in FIG. 6 wherein a periscopic optical system 86 of the same general character as that disclosed in FIGS. 4 and 5 is used to provide means for realistically viewing the inside of a chamber such as a "Hot Laboratory" or the like through a protective wall 88 of substantial thickness.

In FIG. 6, there is illustrated a vertical cross-sectional view of the wall 88 having formed therein upper and lower elongated slots 90 and 92 respectively which each extend partially into wall 88 from opposite sides thereof. Slots 90 and 92 are joined by a vertically disposed rectangular cavity 94 within the wall 88 which functions in combination with slots 90 and 92 to provide a communication from one side of wall 88 to the other thereof. Both the slots 90 and 92 and cavity 94 may extend horizontally along wall 88 over any desired predetermined distance and together form an offset opening through wall 88 into which the periscopic optical components are located. In slot 90, which will hereinafter be designated as being on the inside or "Hot" side of wall 88, is secured an elongated cylindrically shaped positive optical refracting element 96 which is of substantially the same height and width as slot 90 and will hereinafter be referred to as the objective lens 96 of the optical system. The objective lens 96 is preferably positioned with its curved face portion directed inwardly of slot 90 so as to cause its opposite side to be disposed in substantially flush relation with the inner side of wall 88.

A highly reflective plane mirror surface is positioned at the juncture of slot 90 and cavity 86 and is so angularly positioned relative to the obective lens 96 as to cause image-forming light rays entering the system through said lens to be reflected downwardly into cavity 94 along a path inclined toward the inner side of wall 88 so as to cause said rays to be imaged (in the vertical meridian) at a point 100 on the respective side wall 102 of cavity 94. Point 100 is located at an optical distance from the obective lens 96 equal to the focal length of said objective lens. The side wall 102 of cavity 94 is provided with a highly reflective mirror surface which, in turn, reflects the image-forming light rays further downwardly into cavity 94 along a path inclined oppositely and at equal angles to the incident light rays at point 100.

At the juncture of the slot 92 and cavity 94 there is provided another highly reflective mirror surface 104 which receives the image-forming light rays and mirror 104 is so angled relative to the mirror surface 102 as to direct said light rays outwardly of wall 88 through slot 92. A cylindrical collimating lens element 106 of a height and width substantially equal to the height and width of slot 92 is secured therein at its open end. Collimating lens 106 is located at an optical distance from point 100 equal to its focal length (in the vertical meridian) and its focal length is controlled to be equal to the focal length of the objective lens 96.

Thus, with the point 100 being the coincident focal plane (in the vertical meridian) of lenses 96 and 106 and said lenses being of substantially equal focal lengths, it can be seen that a unit power periscopic optical system is provided in FIG. 6 and its mode of operation will be identical to that described above for the other optical systems of the invention. That is, from a predetermined eye position 108, an observer may view the interior of a laboratory or the like through a relatively thick protective wall 88 and, in so doing, enjoy a realistically appearing and undistorted image of the inner surroundings while having substantial freedom of head movement. Moreover, the optical system of FIG. 6 may be constructed to extend across an entire wall in which case several observers in side-by-side relation with each other could simultaneously view the interior of a laboratory.

It is pointed out that the major difference between the viewing system of FIG. 6 and the viewing systems of FIGS. 4 and 5 lies in the fact that image-forming light rays are passed through an air space between elements 96 and 106 in FIG. 6 whereas in FIGS. 4 and 5 the light rays are transmitted through a solid medium. In this respect, for a given cross-sectional area, it is a well-known fact that the solid medium will produce a broader field of view due to its refractive qualities. Thus, it is to be understood that the air space through wall 88 of FIG. 6 may be filled with a transparent optical medium if such is found to be more desirable. This would, of course, require a slight modification of the curvatures of the optical elements 96 and 106 in accordance with the particular index of refraction of the optical medium filling said air space. In the case of the tank-type periscope of FIGS. 4 and 5, the use of the solid block 58 of optical medium is advantageous from the standpoint of added protection for the operator of the vehicle since it tends to prevent a possible ricochet of shrapnel or the like through the viewing opening 56.

From the foregoing, it can be seen that simple, economical, and highly efficient means have been provided for accomplishing all of the objects and advantages of the invention. Nevertheless, it is to be understood that various changes in the arrangement of parts and details of construction may be made by those skilled in the art without departing from the spirit of the invention as expressed in the accompanying claims. The invention, therefore, should not be limited to the exact matters shown and described as only the preferred matters have been given by way of illustration.

Having described the invention, I claim:

1. A periscopic optical system for providing a realistically appearing view of an object field forwardly of said system, said system comprising a vertically extending solid block of transparent optical material having an appreciable transverse dimension so as to provide a relatively wide binocular field of view, a first positive cylindrically curved forwardly facing optical surface carried by said block at its upper end and arranged with its axial meridian in a horizontal direction so as to vertically converge light rays entering said block from said object field and form a real image of said object field at a predetermined focal plane in said system without producing a side-for-side reversal of said image-forming rays, said block having first and second optically aligned specularly reflecting internal surfaces for directing said convergent light rays downwardly through said block along a predetermined optical axis and for inverting said rays, and light-reflecting and converging means including a second positive cylindrically curved optical surface at the lower end of said block for receiving said downwardly directed light rays and for directing same rearwardly from said block, said second cylindrically curved optical surface having its axial meridian in parallel relation to the axis of said first cylindrical surface, said cylindrical surfaces having substantially equal focal lengths and being spaced from each other along said optical axis a distance substantially equal to the sum of their focal lengths, whereby said cylindrical optical surfaces will have a common focal plane in said system and said system will have a unit power magnification of image considered in both the vertical and transverse directions thereof and will provide an upright and realistically appearing image of objects in said object field.

2. A periscopic optical system for providing a realistically appearing view of an object field forwardly of said system, said system comprising first and second elongated cylindrically curved convergent optical components disposed in vertically offset relation relative to each other at spaced locations on a predetermined optical axis of said system, said cylindrically curved components having their respective axial meridians extending horizontally and disposed in substantially parallel relation to each other, said first cylindrically curved component being a forwardly facing component arranged to receive light rays from said object field, means providing a plurality of plane specularly reflecting optical surfaces disposed respectively at spaced locations on said optical axis between said cylindrically curved convergent components and so angularly positioned relative to said first component and to each other as to successively receive the light rays coming from said object field and converged by said first cylindrically curved component and to direct same in a predetermined vertically offset relation toward said second cylindrically curved convergent component, said first cylindrically curved component having a predetermined focal length and serving to focus all of said light rays from said object field contained in each vertical plane therethrough at a predetermined focal plane in said system and to form a real image at said focal plane without producing a side-for-side reversal of said image-forming rays, said second cylindrically curved convergent component having a predetermined focal length which is substantially equal to the focal length of said first cylindrically curved component, and said convergent components being axially spaced from each other a distance substantially equal to the sum of said focal lengths, said second convergent component serving to direct the light rays so received rearwardly as parallel rays toward an eye position adjacent an exit pupil of said system and spaced a predetermined distance from said second optical component, said plane specularly reflecting optical surfaces also functioning jointly in said system to invert said light rays before reaching said second cylindrically curved convergent component, whereby a unit power forwardly directed periscopic optical system having a relatively wide field of view will be provided and objects in all parts of said object field will appear to an observer from said eye position upright and to be of proper size and shape and in proper positional relation to each other.

3. A periscopic optical system for providing a realistically appearing view of an object field forwardly of said system, said system comprising first and second elongated cylindrically curved convergent optical components disposed in vertically offset relation relative to each other at spaced locations on a predetermined optical axis of said system, said cylindrically curved components having their respective axial meridians extending horizontally and disposed in substantially parallel relation to each other, said first cylindrically curved component being a forward facing refracting component arranged to receive light rays from said object field, means providing first and second plane specularly reflecting optical surfaces disposed respectively at spaced locations on said optical axis between said cylindrically curved convergent components and so angularly positioned relative to said first component and to each other as to successively receive the light rays coming from said object field and converged by said first cylindrically curved component and to direct same in a predetermined vertically offset relation toward said second cylindrically curved convergent component, said first cylindrically curved component having a predetermined focal length and serving to focus all of said light rays from said object field contained in each vertical plane therethrough at a predetermined focal plane in said system and to form a real image at said focal plane without producing a side-for-side reversal of said image-forming rays, said second cylindrically curved convergent component being a reflecting component having a predetermined focal length which is substantially equal to the focal length of said first cylindrically curved component, and said convergent components being axially spaced from each other a distance substantially equal to the sum of said focal lengths, said second convergent component serving to direct the light rays so received rearwardly as parallel rays toward an eye position adjacent an exit pupil of said system and spaced a predetermined distance from said second optical component, said first and second plane specularly reflecting optical surfaces also functioning jointly in said system to invert said light rays before reaching said second cylindrically curved convergent component, whereby a unit power forwardly directed periscopic optical system having a relatively wide field of view will be provided and objects in all parts of said object field will appear to an observer from said eye position upright and to be of proper size and shape and in proper positional relation to each other.

4. The combination as set forth in claim 2 and wherein said second cylindrically curved component is pivotally mounted for angular adjustment about an adjacent horizontally disposed axis so as to allow said eye position to be adjusted vertically.

5. A periscopic optical system for providing a realistically appearing view of an object field forwardly of said system, said system comprising first and second elongated cylindrically curved convergent optical components disposed in vertically offset relation relative to each other at spaced locations on a predetermined optical axis of said system, said cylindrically curved components having their respective axial meridians extending horizontally and disposed in substantially parallel relation to each other, a supporting housing, said first cylindrically curved component being a forwardly facing refracting component forming a forward wall portion of said housing and being arranged to receive light rays from said object field, means within said housing providing first and second plane specularly reflecting optical surfaces disposed respectively at spaced locations on said optical axis between said cylindrically curved convergent components and so angularly positioned relative to said first cylindrically curved component and to each other as to successively receive the light rays coming from said object field and converged by said first cylindrically curved component and to direct same in a predetermined vertically offset relation toward said second cylindrically curved convergent component, an elongated transversely disposed transparent window carried by said housing forwardly of said second reflecting element and functioning to completely enclose the space between said reflecting elements, said first cylindrically curved component having a predetermined focal length and serving to focus all of said light rays from said object field contained in each vertical plane therethrough at a predetermined focal plane in said system and to form a real image at said focal plane without producing a side-for-side reversal of said image-forming rays, said second cylindrically curved convergent component being a reflecting component having a predetermined focal length which is substantially equal to the focal length of said first cylindrically curved component, and said convergent components being axially spaced from each other a distance substantially equal to the sum of said focal lengths, said second convergent component serving to direct the light rays so received rearwardly as parallel rays toward an eye position adjacent an exit pupil of said system and spaced a predetermined distance from said second optical component, said first and second plane specularly reflecting optical surfaces also functioning jointly in said system to invert said light rays before reaching said second cylindrically curved convergent component, whereby a unit power forwardly directed periscopic optical system having a relatively wide field of view will be provided and objects in all parts of said object field will appear to an observer from said eye position upright and to be of proper size and shape and in proper positional relation to each other.

6. A periscopic optical system for providing a realistically appearing view of an object field forwardly of said system, said system comprising first and second elongated cylindrically curved convergent optical components disposed in vertically offset relation relative to each other at spaced locations on a predetermined optical axis of said system, said cylindrically curved components having their respective axial meridians extending horizontally and disposed in substantially parallel relation to each other, said first cylindrically curved component being a forwardly facing refracting component arranged to receive light rays from said object field, means providing first and second plane specularly reflecting optical surfaces disposed respectively at spaced locations on said optical axis between said cylindrically curved convergent components and so angularly positioned relative to said first component and to each other as to successively receive the light rays coming from said object field and converged by said first cylindrically curved component and to direct same in a predetermined vertically offset relation toward said second convergent cylindrically curved component, said first cylindrically curved component having a predetermined focal length and serving to focus all of said light rays from said object field contained in each vertical plane therethrough at a predetermined focal plane in said system and to form a real image at said focal plane without producing a side-for-side reversal of said image-forming rays, said second cylindrically curved convergent component having a predetermined focal length which is substantially equal to the focal length of said first component, and said convergent components being axially spaced from each other a distance substantially equal to the sum of said focal lengths, and an elongated slightly convergent cylindrical refractive optical component disposed in said system near said focal plane and with its axial meridian parallel to the axial meridians of said first and second convergent components so as to serve as a field lens, said second convergent component serving to direct the light rays transmitted by said field lens rearwardly as parallel rays toward an eye position adjacent an exit pupil of said system and spaced a relatively small predetermined distance from said second optical component, said first and second plane specularly reflecting optical surfaces also functioning jointly in said system to invert said light rays before reaching said second cylindrically curved convergent component, whereby a unit power forwardly directed periscopic optical system having a relatively wide field of view and an exit pupil near said second component will be provided and objects in all parts of said object field will appear to an observer from said eye position upright and to be of proper size and shape and in proper positional relation to each other.

7. In a vehicle having an enclosed streamlined body and a viewing opening in a steeply sloping wall portion thereof, the combination of a transparent shield covering said viewing opening in substantially flush relation with the outer surface of said body, and a periscopic optical system in said body for providing a realistically appearing view of an object field forwardly of said vehicle from a predetermined vertically offset eye position in said vehicle, said optical system comprising first and second elongated cylindrically curved convergent optical components disposed in vertically offset relation relative to each other at spaced locations on a predetermined optical axis of said system, said cylindrically curved components having their respective axial meridians extending horizontally and disposed in substantially parallel relation to each other, said first cylindrically curved component being a forwardly facing component arranged closely adjacent said transparent shield so as to receive light rays from said object field entering through said transparent shield, means providing first and second plane specularly reflecting optical surfaces disposed respectively at spaced locations on said optical axis between said cylindrically curved convergent components and so angularly positioned relative to said first component and to each other as to successively receive the light rays coming from said object field and converged by said first cylindrically curved component and to direct same in a predetermined vertically offset relation toward said second convergent cylindrically curved component, said first cylindrically curved component having a predetermined focal length and serving to focus all of said light rays from said object field contained in each vertical plane therethrough at a predetermined focal plane in said system and to form a real image at said focal plane without producing a side-for-side reversal of said image-forming rays, said second cylindrically curved convergent component having a predetermined focal length which is substantially equal to the focal length of said first cylindrically curved component, and said convergent components being axially spaced from each other a distance substantially equal to the sum of said focal lengths, said second convergent component serving to direct the light rays so received rearwardly as parallel rays toward an eye position adjacent an exit pupil of said system and spaced a predetermined distance from said second cylindrically curved component, said first and second plane specularly reflecting optical surfaces also functioning jointly in said system to invert said light rays before reaching said second cylindrically curved convergent component, whereby a unit power forwardly directed periscopic optical system having a relatively wide field of view will be provided thereby and objects in all parts thereof will appear to an observer from said eye position upright and to be of proper size and shape and in proper positional relation to each other.

8. In a vehicle having an enclosed streamlined body and a viewing opening in a steeply sloping wall portion thereof, the combination of a transparent shield covering said viewing opening in substantially flush relation with the outer surface of said body and providing an unobstructed upwardly and forwardly directed view of a first predetermined external object field from a predetermined eye position within said body, and a periscopic optical system in said body for providing a realistically appearing indirect view at unit magnification of a second object field forwardly of said vehicle and in adjoining relation to said first object field from said predetermined eye position relative to said first field, said optical system comprising first and second elongated cylindrically curved convergent optical components disposed in vertically offset relation relative to each other at spaced locations on a predetermined optical axis of said system, said cylindrically curved components having their respective axial meridians extending horizontally and disposed in substantially parallel relation to each other, said first cylindrically curved component being a forwardly facing component arranged closely adjacent said transparent shield so as to receive light rays from said object field entering through said shield, means providing first and second plane specularly reflecting optical surfaces disposed respectively at spaced locations on said optical axis between said cylindrically curved convergent components and so angularly positioned relative to said first component and to each other as to successively receive the light rays coming from said object field and converged by said first component and to direct same in a predetermined vertically offset relation toward said second convergent cylindrically curved component, said first cylindrically curved component having a predetermined focal length and serving to focus all of said light rays from said object field contained in each vertical plane therethrough at a predetermined focal plane in said system and to form a real image at said focal plane without producing a side-for-side reversal of said image-forming rays, said second cylindrically curved convergent component having a predetermined focal length which is substantially equal to the focal length of said first cylindrically curved component, and said convergent components being axially spaced from each other a distance substantially equal to the sum of said focal lengths, said second convergent component serving to direct the light rays so received rearwardly as parallel rays toward an eye position adjacent an exit pupil of said system and spaced a predetermined distance from said second cylindrically curved component, said first and second plane specularly reflecting optical surfaces also functioning jointly in said system to invert said light rays before reaching said second cylindrically curved convergent component, whereby a unit power forwardly directed periscopic optical system having a relatively wide field of view will be provided thereby and objects in all parts thereof will appear to an observer from said eye position upright and to be of proper size and shape and in proper positional relation to each other and to portions of said first object field adjacent thereto.

9. In a vehicle having a protective wall and an opening in an upper sloping wall portion thereof, the combination of a transparent shield closing said opening, an elongated horizontally extending cylindrically curved refracting component of positive power and having a predetermined focal length adjacent an upper edge of said opening so as to intercept and converge light rays passing through said transparent shield from an object field located directly forwardly of said vehicle, a plane mirror disposed rearwardly of said refracting component for intercepting said convergent light rays from said refracting component and for directing same downwardly toward a second plane mirror, and said second mirror being disposed so as to direct said rays downwardly and forwardly within said vehicle toward a predetermined focal plane, said mirrors also jointly functioning so as to produce an inversion of the light rays at said focal plane without a side-for-side reversal thereof, an elongated horizontally extending cylindrically curved reflecting component of positive power disposed in the path of said convergent light rays travelling beyond said focal plane and adjacent the lower edge of said opening so as to intercept said light rays and reflect same rearwardly as parallel rays toward an eye position at the exit pupil of said system and within said vehicle at a predetermined distance from said reflecting component, said reflecting component having a focal length equal to that of said refracting component, said refracting and reflecting components being spaced from each other along a common optical axis a distance substantially equal to the sum of their focal lengths so as to constitute a unit power system having its exit pupil at said eye position, whereby said reflecting and refracting components and said plane mirrors will form a periscopic optical system for viewing a first field directly forwardly of said vehicle from said eye position and the optical members of said system will be so disposed relative to said opening as to simultaneously permit from said eye position an unobstructed direct view of a second object field above and in merging relation with said first object field.

10. A periscopic optical system for providing a realistically appearing view of an object field forwardly of said system, said system comprising a pair of vertically extending aligned solid blocks of transparent optical material having an appreciable transverse dimension so as to provide a relatively wide binocular field of view, a first positive cylindrically curved forwardly facing optical surface carried by the upper end of the upper block and arranged with its axial meridian in a horizontal direction so as to vertically converge light rays entering said last-mentioned block from said object field and form a real image of said object field at a predetermined focal plane in said system without producing a side-for-side reversal of said image-forming rays, said blocks having first and second optically aligned specularly reflecting internal surfaces for directing said convergent light rays downwardly through said blocks along a predetermined optical axis and for inverting said rays, and light-reflecting and converging means including a second positive cylindrically curved optical surface at the lower end of said blocks for receiving said downwardly directed light rays and for directing same rearwardly from said last-mentioned end, said second cylindrically curved optical surface having its axial medidian in parallel relation to the axis of said first cylindrical surface, said cylindrical surfaces having substantially equal focal lengths and being spaced from each other along said optical axis a distance substantially equal to the sum of their focal lengths, whereby said cylindrical optical surfaces will have a common focal plane in said system and said system will have a unit power magnification of image considered both vertically and horizontally, and cylindrically curved light-refracting means in said system substantially at the location of said common focal plane and with its axial meridian disposed in parallel relation to those of said first and second cylindrically curved optical surfaces, said refracting means being adapted to function in cooperation with said cylindrically curved surfaces so as to move the eye position of said system to a predetermined location nearer the last cylindrical surface of said system, said system providing an upright and realistically appearing image of objects in said object field.

References Cited in the file of this patent
UNITED STATES PATENTS

| | | |
|---|---|---|
| 784,852 | Goerz | Mar. 14, 1905 |
| 1,521,339 | Taylor | Dec. 30, 1924 |
| 1,525,658 | Roach | Feb. 10, 1925 |
| 1,747,928 | Chesney | Feb. 18, 1930 |
| 1,969,852 | Markosek | Aug. 14, 1934 |
| 2,674,921 | Williams | Apr. 13, 1954 |

FOREIGN PATENTS

| | | |
|---|---|---|
| 78,482 | Sweden | Apr. 23, 1932 |
| 743,180 | France | Jan. 6, 1933 |
| 472,808 | Great Britain | Sept. 30, 1937 |